April 29, 1930.  E. W. SEEGER  1,756,572
MOTOR CONTROL SYSTEM
Filed Sept. 21, 1925  2 Sheets-Sheet 2
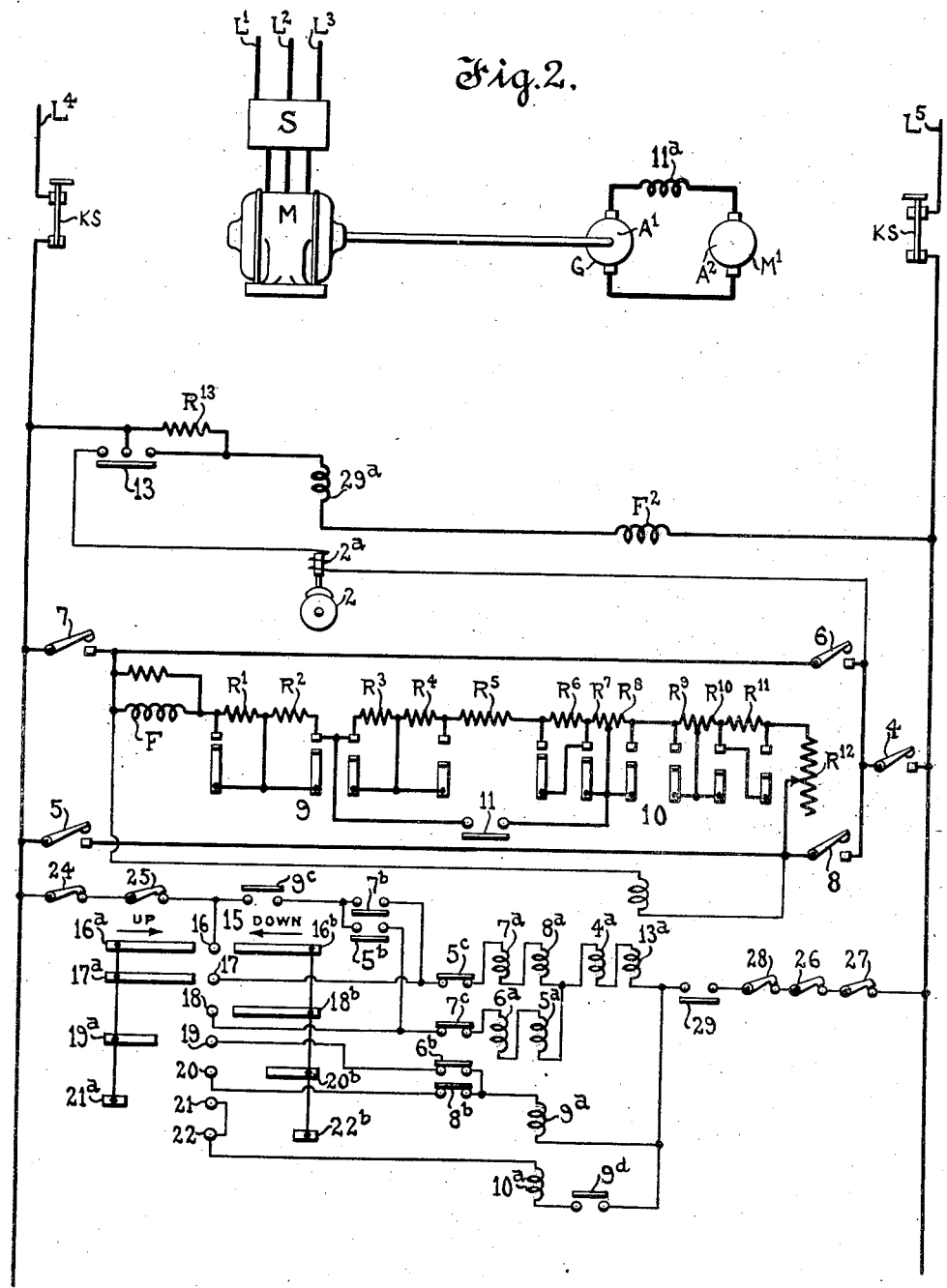
INVENTOR.
Edwin W. Seeger
BY
ATTORNEY Patented Apr. 29, 1930

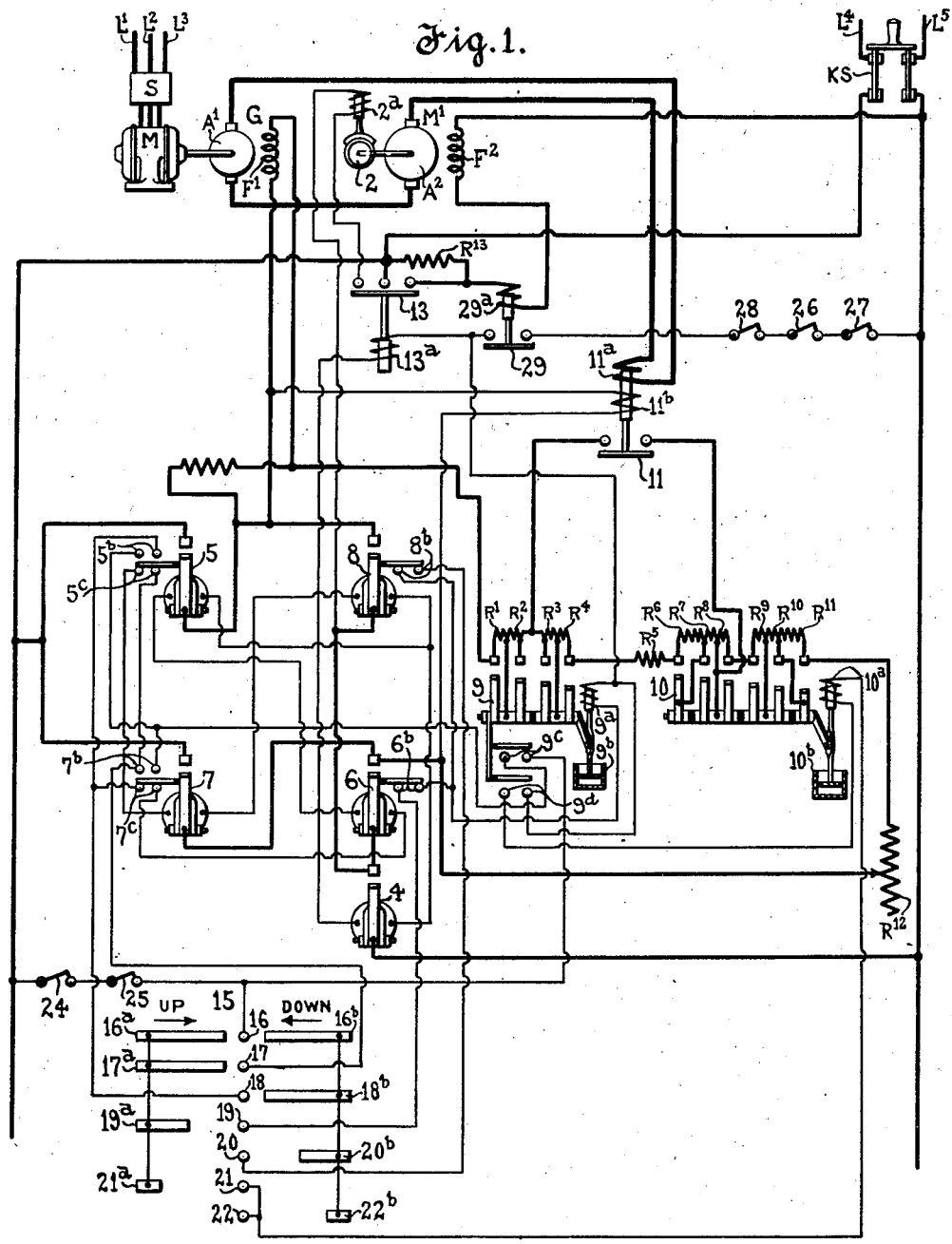

1,756,572

UNITED STATES PATENT OFFICE

EDWIN W. SEEGER, OF MILWAUKEE, WISCONSIN, ASSIGNOR, BY MESNE ASSIGNMENTS, TO CUTLER-HAMMER INC., OF MILWAUKEE, WISCONSIN, A CORPORATION OF DELAWARE

MOTOR-CONTROL SYSTEM

Application filed September 21, 1925. Serial No. 57,513.

This invention relates to motor control systems for elevators, hoists or similar machines.

The invention is particularly applicable to systems of the Ward Leonard type wherein the driving motor is supplied with current from a generator and is accelerated, decelerated and reversed by increasing, decreasing and reversing the field of the generator.

The present invention has among its objects to provide a control system of the aforesaid character having improved means for providing smooth and rapid acceleration and deceleration of the driving motor under varying load conditions.

Another object is to provide a controller of the aforesaid character which provides a substantially uniform rate of acceleration of the driving motor during raising or lowering of the load.

Another object is to provide a motor control system of the aforesaid character wherein a graduated dynamic braking effect is obtained.

Another object is to provide a motor control system of the aforesaid character which insures against reversal of the field of the generator prior to inclusion of all of the control resistance.

Various other objects and advantages of the invention will hereinafter appear.

The accompanying drawing diagrammatically illustrates an embodiment of the invention which will now be described, it being understood that the embodiment illustrated is susceptible of modification without departing from the spirit and scope of the appended claims.

In the drawing:

Figure 1 is a diagrammatic view of a preferred form of the controller; and

Fig. 2 is a so-called across-the-line diagram of the circuit connections shown in Fig. 1.

Referring to Fig. 1. the same illustrates a motor generator set including a driving motor M and a generator G. Motor M may be of any desired type, as, for example, a three phase alternating current motor, and, as illustrated in the drawing, the same is supplied with current from lines $L^1$, $L^2$ and $L^3$, and is started and stopped by any suitable type of controller S. Generator G is provided with an armature $A^1$ and a shunt field $F^1$, and the same supplies current to a motor $M^1$, said motor having an armature $A^2$ and a shunt field $F^2$. The fields $F^1$ and $F^2$ of the generator G and motor M are supplied with current from any suitable direct current source, as, for example, lines $L^4$ and $L^5$, and, as shown in the drawing, a knife switch KS is employed for connecting and disconnecting said fields from said source.

Motor $M^1$ is accelerated, decelerated and reversed by increasing, decreasing and reversing the voltage of the generator G. The field $F^1$ of the generator G is controlled through the medium of a single pole electromagnetic switch 4 and two sets of single pole electromagnetic reversing switches 5—6 and 7—8 and the strength of such field is regulated by means of resistance sections $R^1$ to $R^{12}$, inclusive. Resistance sections $R^1$ to $R^4$, inclusive, are controlled by an electromagnetically operated resistance varying device 9, while resistance sections $R^6$ to $R^{11}$, inclusive, are controlled by an electromagnetically operated resistance varying device 10. Resistance section $R^{12}$ is variable, and, for purposes hereinafter set forth, an electromagnetically operated relay 11 is provided for establishing a shunt circuit around resistance sections $R^3$ to $R^7$, inclusive.

More specifically, the resistance varying devices 9 and 10 are provided with electromagnetic operating windings $9^a$ and $10^a$, respectively, and each of said devices is provided with a plurality of normally open contact fingers adapted to close successively upon energization of its respective winding. Also, the devices 9 and 10 are provided with dashpots $9^b$ and $10^b$, respectively, for retarding opening and closing movements thereof. Relay 11 is normally open and is provided with two operating windings $11^a$ and $11^b$, the former being included in series in the armature circuit of generator G and the latter being adapted to be connected across lines $L^4$ and $L^5$ upon closure of switch 4 and either set of reversing switches 5—6 or 7—8. The field $F^2$ of motor M is normally connected across lines $L^4$ and $L^5$ through the medium of a resistance $R^{13}$, and a normally open electromagnetic relay 13 is provided for shunting said resistance and for also establishing an energizing circuit for a normally engaged electromagnetic brake 2 associated with motor $M^1$.

Switch 4, reversing switches 5—6 and 7—8 and the resistance varying devices 9 and 10 are all controlled by a master switch 15, said master switch being provided with stationary contacts 16 to 22, inclusive, and two sets of movable contacts arranged on opposite sides thereof. One set of said movable contacts includes contacts $16^a$, $17^a$, $19^a$ and $21^a$, while the other includes contacts $16^b$, $18^b$, $20^b$ and $22^b$. In addition to the aforedescribed control parts, the controller includes up limit switches 24 and 25, down limit switches 26 and 27, a car safety switch 28 and a normally open relay 29, all of which are arranged in series in the energizing circuits extending through master switch 15. Relay 29 is provided with an operating winding $29^a$ connected in series with the field $F^2$ of motor $M^1$. The control means still further includes normally open auxiliary contacts $5^b$ and normally closed auxiliary contacts $5^c$ associated with switch 5, normally open auxiliary contacts $7^b$ and normally closed auxiliary contacts $7^c$ associated with reversing switch 7, and normally closed auxiliary contacts $6^b$ and $8^b$ associated with reversing switches 6 and 8, respectively. Also, for purposes hereinafter set forth, the resistance varying device 9 is provided with two sets of normally open auxiliary contacts $9^c$ and $9^d$.

The function and operation of the aforedescribed controller together with the circuit connections therefor will now be more fully described in connection with Fig. 2. Assuming that the knife switch KS is closed it is apparent from Fig. 2 that the field $F^2$ of the motor $M^1$ is connected across lines $L^4$ and $L^5$ by a circuit extending from line $L^4$ through resistance $R^{13}$ to and through the operating winding $29^a$ of relay 29 and thence through said field to line $L^5$. Relay 29 is thus held in closed position, and, assuming that the limit switches 24, 25, 26 and 27 are in closed position and also that the car safety switch 28 is in closed position, it is apparent that upon movement of the master switch 15 towards the right into its first speed position, switches 4, 7 and 8 and relay 13 will be energized by a circuit extending from line $L^4$ through limit switches 24 and 25, through contacts 16, $16^a$, $17^a$ and 17, through auxiliary contacts $5^c$ of reversing switch 5, through windings $7^a$, $8^a$, $4^a$ and $13^a$, and then through relay 29, safety switch 28 and limit switches 26 and 27 to line $L^5$. Relay 13 in responding excludes resistance $R^{13}$ in the field circuit of motor $M^1$ and also establishes an energizing circuit for brake 2 extending from line $L^4$ through relay 13, through the operating winding $2^a$ of said brake and then through main switch 4 to line $L^5$. Closure of switch 4 and reversing switches 7 and 8 connects the field F of the generator G across lines $L^4$—$L^5$ through resistance sections $R^1$ to $R^{12}$, inclusive. The generator G then operates to supply current of low voltage to motor $M^1$ for slow speed operation of the latter in its up direction. Movement of the master switch 15 towards the right into its second speed position establishes an energizing circuit for the resistance varying device 9 extending from line $L^4$ through limit switches 24 and 25, through contacts 16, $16^a$, $19^a$ and 19, through auxiliary contacts $6^b$ of reversing switch 6 to and through the operating winding $9^a$ of said device and then through relay 29, safety switch 28 and limit switches 26 and 27 to line $L^5$. In responding resistance varying device 9 shunts the resistance sections $R^1$, $R^2$, $R^3$ and $R^4$ in the order named to thereby strengthen the field of the generator and increase the voltage of the current supplied by the generator G to motor $M^1$ for second speed operation of the latter. Upon initial operation of device 9 its associated contacts $9^c$ close and upon full operation thereof its associated contacts $9^d$ close. Closure of auxiliary contacts $9^c$ establishes a maintaining circuit for switches 4, 7 and 8 and for relay 13, such maintaining circuit extending from line $L^4$ through limit switches 24 and 25, through auxiliary contacts $9^c$ of device 9, through auxiliary contacts $7^b$ and $5^c$ of reversing switches 7 and 5, through the operating windings $7^a$, $8^a$, $4^a$ and $13^a$ and then through relay 29, safety switch 28 and limit switches 26 and 27 to line $L^5$. With master switch 15 in its third speed right hand position an energizing circuit for the resistance varying device 10 is established from line $L^4$ through limit switches 24 and 25, through contacts 16, $16^a$, $21^a$, 21 and 22 to and through the operating winding $10^a$ of said device and then through auxiliary contacts $9^d$, relay 29, safety switch 28 and limit switches 26 and 27 to line $L^5$. In responding, resistance varying device 10 gradually excludes resistance sections $R^6$ to $R^{11}$, inclusive, from the field circuit of the generator G to thereby increase the voltage of the current supplied by said generator to motor $M^1$ for third speed operation of the latter.

Assuming now that the master switch 15 is moved from off position into its first speed left hand position, an energizing circuit for reversing switches 5 and 6, main switch 4 and relay 13, is established from line $L^4$, through limit switches 24 and 25, through contacts 16, $16^b$, $18^b$ and 18, through auxiliary contacts $7^c$ of reversing switch 7 to and through the operating windings $6^a$, $5^a$, $4^a$ and $13^a$ and then through relay 29, safety switch 28 and limit switches 26 and 27 to line $L^5$. Upon response of relay 13 the same acts in the manner aforedescribed to increase the field strength of motor $M^1$ and to effect release of brake 2. Also, upon response of switches 4, 5 and 6, the field F of the generator is connected across lines $L^4$ and $L^5$, through resistance sections $R^1$ to $R^{11}$, and the generator then supplies current to the motor $M^1$ at a voltage for low speed operation of the latter in its down direction. With master switch 15 in its second speed left hand position the aforedescribed energizing circuit for resistance varying device 9 is established through the medium of contacts 16, $16^b$, $20^b$ and 20 and auxiliary contacts $8^b$ of reversing switch 8. Resistance varying device 9 then acts in the manner above described to exclude resistance sections $R^1$ to $R^4$, inclusive, from the field circuit of the generator to increase the voltage of the current supplied by the generator to the motor for second speed operation of the latter in its down direction. Also, it should be noted that upon initial operation of device 9 the auxiliary contacts $9^c$ thereof establish a maintaining circuit for switches 4, 5 and 6 and relay 13 through the medium of contacts $5^b$ and $7^c$ of reversing switches 5 and 7. With the master switch 15 in its left hand third speed position the aforedescribed energizing circuit for resistance varying device 10 is established through the medium of contacts 16, $16^b$, $22^b$ and 22 of said master switch, and, as above described, resistance varying device 10 in responding excludes resistance sections $R^6$ to $R^{11}$, inclusive, in the field circuit of generator G to provide for third speed operation of motor $M^1$.

Although the operation has been described in detail for a step by step movement of the master switch 15, it will be understood that said master switch may be moved rapidly from off position into either of its third speed positions without defeating the aforedescribed steps in the operation of the controller. When the controller is moved directly from off position into either of its third speed positions the resistance varying device 10 cannot respond until full operation of the resistance varying device 9. Furthermore, it should be noted that with the controller arranged as above described motor $M^1$ cannot be reversed until all of the resistance sections $R^1$ to $R^{11}$ are reincluded in the field circuit of the generator. In other words, if the master switch is in either of its second or third speed positions and is moved directly therefrom into a position to effect reversal of the motor, the auxiliary contacts $9^c$ associated with resistance varying device 9 insure against reversal of the field $F^1$ of the generator until resistance varying device 9 returns to normal position. Also, it should be noted that the dashpots $9^b$ and $10^b$ in retarding opening movement of their respective devices insure gradual inclusion of the resistance steps to thereby effect a gradual decrease in the field strength of the generator for gradual deceleration of motor $M^1$. Upon interruption of the power connections for the generator field relay 13 drops out to provide for setting of brake 2 and reinclusion of resistance $R^{13}$ in the field circuit of the motor.

As hereinbefore set forth, a relay 11 is provided for shunting resistance sections $R^3$ to $R^7$, inclusive, such relay being provided with an operating coil $11^a$ which is connected in series between the armature A of the generator G and the armature $A^2$ of motor $M^1$ and a shunt coil $11^b$ which is controlled by switch 4 and the two sets of reversing switches 5—6 and 7—8. It is apparent from Fig. 2 that upon reversal of the field $F^1$ of the generator the polarity of the shunt coil $11^b$ is also reversed and said shunt coil is arranged so that when the motor is receiving current from the generator the same will always act cumulatively with the coil $11^a$. Coil $11^b$ thus serves to assist coil $11^a$ to effect response of relay 11 when the motor $M^1$ receives current from the generator and to oppose coil $11^a$ when the motor acts as a generator. Coil $11^a$ is calibrated to effect response of relay 11 upon the initial rush of starting current to the motor and to permit dropping out of relay 11 when the current supplied to the motor drops to a given value. In other words, coil $11^a$ effects response of relay 11 during both raising and lowering of the load, but, if the motor tends to act as a generator during lowering of the load, said coil will insure opening of said relay. Furthermore, during raising of the load, coil $11^a$ tends to hold relay 11 closed if the load is above a given value and permits dropping out of said relay if the load on the motor is below a given value whereby said relay tends to maintain the speed of the motor constant for a given setting of the master switch. It should also be noted that upon response of relay 11 the amount of resistance excluded thereby is dependent upon the position of the resistance varying devices 9 and 10. In other words, relay 11 shunts more resistance during slow speed operation of the motor than at high speed operation thereof, and in practice it has been found that such action of the relay 11 tends to provide smooth and rapid acceleration of the driving motor under varying conditions.

What I claim as new and desire to secure by Letters Patent is:

1. The combination with a motor and a generator for supplying current thereto, of a sectional resistance connected in the field circuit of said generator, a device for excluding certain sections of said resistance from the field circuit of said generator to accelerate said motor, and means acting independently of said device for shunting certain of the resistance sections controlled by said device when the current supplied to said motor by said generator exceeds a given value.

2. The combination with a motor and a generator for supplying current thereto, of a sectional resistance in the field circuit of said generator, means for including and excluding certain of the sections of said resistance to vary the field strength of said generator for acceleration and deceleration of said motor and means including a relay responsive when the current supplied to said motor by said generator exceeds a given value to shunt certain of the resistance sections controlled by said means.

3. The combination with a motor and a generator for supplying current thereto, of switches for selectively establishing reverse power connections for the field of said generator to provide for operation of said motor in opposite directions, a sectional resistance in the field circuit of said generator, means including a plurality of control devices each for including and excluding a plurality of sections of said resistance for acceleration and deceleration of said motor, and means for shunting part of the resistance sections controlled by each of said control devices when the current supplied to said motor by said generator exceeds a given value, said means including a relay having a series operating coil subjected to the current supplied to said motor, and a shunt operating coil controlled by said reversing switches.

4. The combination with a motor and a generator in circuit therewith, of means for controlling the field of said generator to vary the speed and direction of rotation of said motor, said means including a resistance in the field circuit of said generator and an electro-responsive device having a plurality of contacts to be closed successively to exclude said resistance in steps and a relay associated with said device for shunting certain of the steps of said resistance to increase the generator field excitation when the current supplied by said generator to said motor exceeds a given value, said relay having a series operating coil connected in the motor load circuit and a shunt operating coil controlled by said means.

5. The combination with a motor and a generator for supplying current thereto, a resistance in the field circuit of said generator, a relay responsive when the motor load current exceeds a given value to shunt said resistance, a second resistance in the field circuit of said generator and a control device for including and excluding both of said resistances in steps in the field circuit of said generator.

6. The combination with a motor and a generator for supplying current thereto, a sectional resistance in the field circuit of said generator, a plurality of devices to be operated sequentially, one for excluding a portion of said resistance and the other for excluding the remainder thereof and a relay responsive when the motor load current exceeds a given value to shunt portions of the resistance controlled by both of said devices.

7. The combination with a motor and a generator for supplying current thereto, of a sectional resistance in the field circuit of said generator, a device responsive to exclude a portion of said resistance for low speed operation of said motor, a second device responsive to exclude the remainder of said resistance for high speed operation of the motor and a switch for shunting portions of the resistor controlled by both of said devices when the current supplied by said generator to said motor exceeds a given value, said switch having shunt and series operating coils, the former coil being subjected to the motor load current.

8. The combination with a motor and a generator in circuit therewith, of reversing switches for selectively establishing reverse power connections for the field of said generator to provide for operation of said motor in opposite directions, a resistance in the field circuit of said generator, a device for including and excluding said resistance in steps, said device having a dash pot associated therewith for retarding resistance including and excluding operations thereof and a switch for shunting a part of said resistor when the current supplied to said motor by said generator exceeds a given value, said switch having a plurality of operating coils, one of said operating coils being subjected to the motor load current and the other being controlled by said reversing switches.

In witness whereof, I have hereunto subscribed my name.

EDWIN W. SEEGER.